United States Patent
Gordon et al.

[19]

[11] Patent Number: 5,987,316
[45] Date of Patent: Nov. 16, 1999

[54] SUBSCRIBER AUTHENTICATION FOR RADIO LOCAL LOOP SYSTEM

[75] Inventors: Malcolm Gordon, Bath; Anthony Martin, Chippenham; Douglas Roger Pulley, Bath, all of United Kingdom

[73] Assignee: Lucent Technologies Inc., Murray Hill, N.J.

[21] Appl. No.: 08/739,778

[22] Filed: Oct. 30, 1996

[30] Foreign Application Priority Data

Jul. 31, 1996 [GB] United Kingdom .................. 9616060

[51] Int. Cl.⁶ ........................................................ H04Q 7/38
[52] U.S. Cl. ............................................................. 455/411
[58] Field of Search ..................................... 455/410, 411

[56] References Cited

U.S. PATENT DOCUMENTS 5,335,265  8/1994  Cooper et al. ........................... 455/410
5,535,431  7/1996  Grube et al. ............................. 455/411
5,638,423  6/1997  Grube et al. ............................. 455/411
5,715,518  2/1998  Barrere et al. .......................... 455/411
5,758,277  5/1998  Hawkes ................................... 455/410

*Primary Examiner*—Willis R. Wolfe

[57] ABSTRACT

The network security of a radio local loop system is highly desirable to avoid fraudulent use of the network by unauthorised users with appropriate subscriber equipment. For fixed subscribers, the propagation delay between base station and subscriber unit will also remain fixed and, provided this is measured with sufficient accuracy, the distance from the subscriber to the base station can be determined. This can be used as an aid to the authentication of a subscriber. Other signal characteristics which are indicative of the physical location of a purported subscriber can be used, such as directional information. In a system in which propagation delay has to be monitored anyway, for other purposes, such as orthogonal CDMA code synchronisation, or for a TDM system, added security can be obtained without great extra cost.

10 Claims, 1 Drawing Sheet

SUBSCRIBER AUTHENTICATION FOR RADIO LOCAL LOOP SYSTEM

TECHNICAL FIELD

This invention relates to radio local loop systems, and more particularly, to methods of improving the authentication procedures of such systems to avoid unauthorised access to the network via the air interface.

BACKGROUND OF THE INVENTION

A local loop is the portion of a telecommunications system which connects a local exchange to the subscribers. Conventionally this is done by means of wires or optical fibres, but a radio link is another possibility. If subscriber stations are mobile, a radio link has to be used, but there are advantages even for static subscribers. For example, lines can be installed, changed and maintained without having to dig up pavements or erect and climb telegraph poles. A radio local loop involves a base station which transmits and receives radio signals at a location which is determined by signal strengths and reception conditions and is not necessarily near to the local telephone exchange, and subscriber units located at subscriber premises, each of which includes an antenna whose location is determined by considerations of signal reception and transmission and a connection to the subscriber's equipment (telephone, fax, computer etc.). Subscribers attempting access to the network will usually have to prove their identity via some means (e.g. electronic serial number, subscriber PIN, smart card key inserted into subscriber unit etc). However, these mechansims can become known to third parties who could then "impersonate" a valid subscriber to gain access via the air interface using representative (or stolen) equipment.

SUMMARY OF THE INVENTION

According to the invention there is provided a method and system as set out in the independent claims.

Particular forms of the invention are set out in the dependent claims.

Measurement of propagation delay between a fixed subscriber and its serving base station provides a method of approximate position fixing of a subscriber and detecting any apparent subscriber movement, anomalies in either would highlight a potential unauthorised subscriber.

BRIEF DESCRIPTION OF THE DRAWING

An embodiment of the invention will now be described by way of example with reference to the accompanying drawing, which is a control diagram illustrating how radio transmission delay is measured, adjusted and monitored in a preferred form of apparatus embodying the invention.

DETAILED DESCRIPTION

Figure 1:
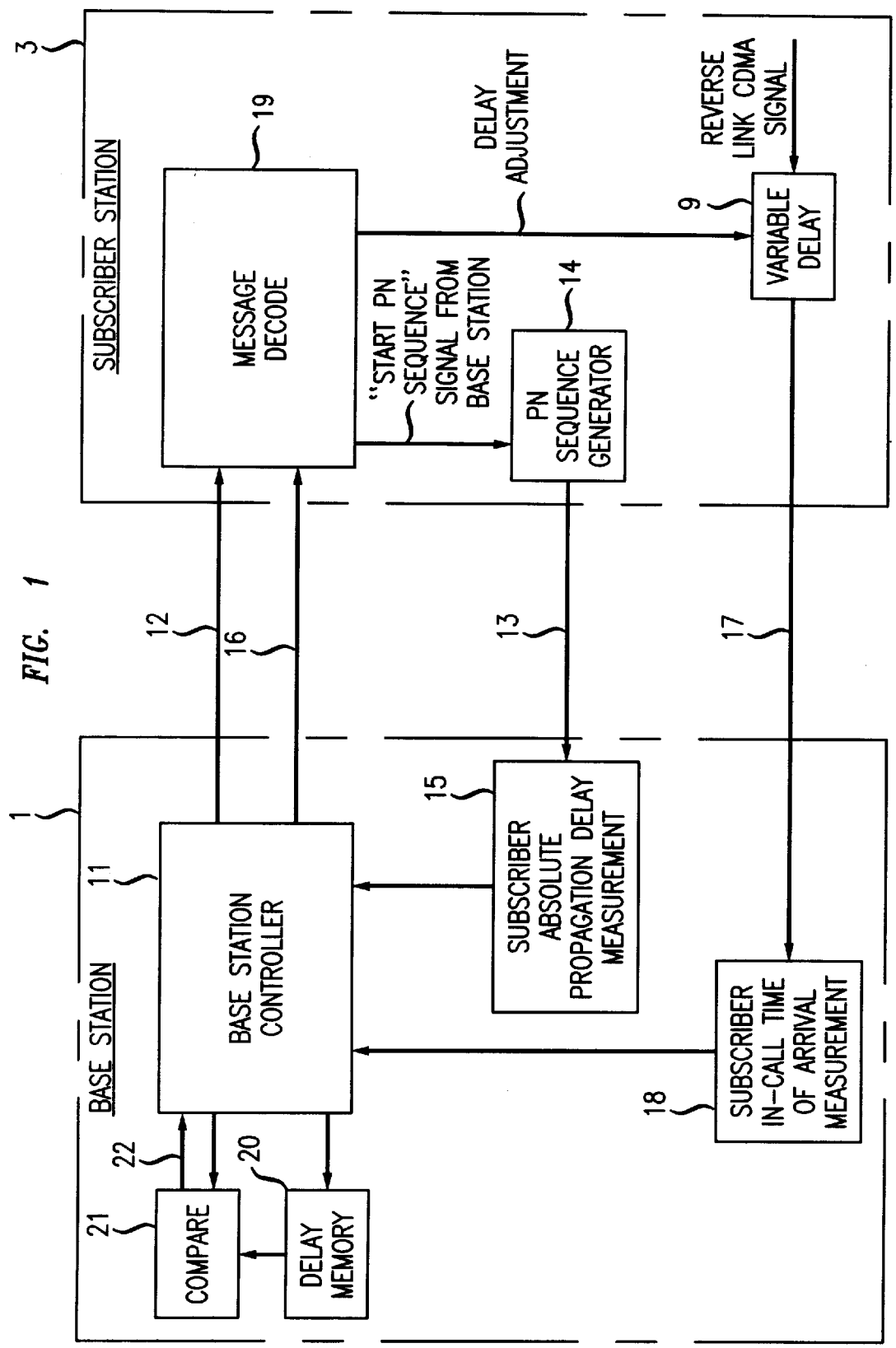

The locations of subscribers in a radio local loop system are by their nature fixed and therefore so (to within close limits) is the propagation delay between them and their serving base station. Regular measurement of this propagation delay by the base station is readily achieved (e.g. transmission of pseudo-noise sequences by subscriber units in synchronism with a marker transmitted to the subscriber units by the base station).

This information can be used in a number of ways to provide enhanced authentication. For example, when an attempt is made to gain access to the system by a purported subscriber and the measured propagation delay is incompatible with a stored value for that subscriber, the purported subscriber can simply be refused access. Alternatively, a secondary security procedure can be initiated which, since it is only used on rare occasions, is less vulnerable to 'scanning' techniques, and can be more complex than a procedure which has to be gone through at every access attempt.

The initial registration of a subscriber may use a pre-calculated value, since the location of the new subscriber and the base station will already be known. Alternatively, a measured value can be used, taken during a setting up procedure carried out by the service provider, which may use highly secure procedures.

Sectorisation of a base station's coverage area using directional base station antennas reduces the ambiguity in subscriber position further still. These procedures are not completely infallible, but when used in conjunction with existing measures provide enhanced network security.

The system illustrated in the drawing is a code-division multiple-access system using orthogonal codes in both the forward and reverse links as disclosed in British patent application number 9523760.8, modified to operate according to the present invention. To approach the performance of a fully-orthogonal CDMA system, signals received from each transmitting subscriber station are closely time-aligned such that symbol boundaries of all subscriber stations' transmissions as received at the base station lie within a time interval defined as the chip period (the reciprocal of the chip rate). The mechanisms employed to achieve this are: synchronisation of the chipping rate and code phase at each subscriber unit; equalisation of radio transmission delay from each subscriber to the base station at the subscriber unit to within a chip period of each other; the measurement of radio transmission delays by the base station to perform (2) above by: the use of a pseudo-noise sequence transmitted by the subscriber unit on demand during idle periods to ensure correct operation of random access attempts by the subscriber unit; the use of the subscriber unit's CDMA transmissions during a call to provide closed loop control of the delay equalisation for during call to account for any slight variations with time of the delay; accurately aligning the carrier frequency at the subscriber station with that of the base station for reliable demodulation and compensation of CDMA signals prior to transmission by the subscriber unit so that the base station experiences negligible carrier frequency error in CDMA signals received from each subscriber. This may be achieved by carrier frequency error estimation by the subscriber unit and the subsequent compensation of the CDMA signals received by the subscriber unit, but that may not be necessary if sufficiently stable oscillators are used in both base station and subscriber unit.

As shown in the drawing, two mechanisms exist to perform the control of each subscriber unit delay block 9 to achieve the appropriate adjustment for each subscriber: Periodic absolute measurement and equalisation of the propagation delay of idle (not in-call) subscriber units to ensure correct alignment with other transmitting units during random access and call setup; In-call equalisation adjustments to maintain sufficiently accurate equalisation for the duration of the call.

In the first mechanism, the base station controller 11 sends a message unit via the forward link control channel 12 to each subscriber unit in turn, requesting the subscriber unit modem to emit a pseudo-noise sequence 13 synchronised to message receipt over the radio path. Each subscriber unit contains a pseudo-random sequence generator 14 for this purpose. The base station 1 uses the received pseudo-random sequence to measure the propagation delay between the subscriber unit 3 and the base station (block 15). The base station controller 11 can then send a second message containing the appropriate delay to be programmed into the delay block 9. This mechanism is used to calibrate the delay equalisation of the subscriber unit on a regular basis to ensure that acquisition of the subscriber's transmissions during random access attempts made by the subscriber can be readily achieved.

The second mechanism provides closed loop adjustment of the reverse link radio transmission delay equalisation of any subscriber unit that is actually involved in a call. The reverse link traffic channels 17 are monitored by the base station 1 and the time delays of the various in-call subscriber stations are tracked (block 18). Some of the traffic channels 16 transmitted by the base station are dedicated to carrying periodically updated time delay equalisation messages to transmitting subscriber units. Subscriber units currently involved in calls decode these channels (block 19) and use the parts of this information specific to their own transmissions to adjust their electronic time delay by small increments relative to their previous value to maintain sufficiently accurate equalisation whilst in-call.

Thus, in the system of British Patent Application No. 9523760.8, information about propagation delay is regularly gathered, and changes monitored, in order to enable the signals in the return link to be orthogonal as received at the base station. In the system illustrated in the drawing this information is also employed to improve security.

When a subscriber is first added to the system, information about the propagation delay for that subscriber is stored in a memory 20. It may, under some conditions, be possible to calculate the propagation delay sufficiently precisely from knowledge of the location of the subscriber. Alternatively, a measured value can be used, as discussed above. Thereafter, whenever a purported subscriber attempts to gain access to the system, the controller 11 retreives the stored propagation delay for that subscriber from the memory 20 and applies the retrieved value and the current measured value to comparing means 21. If the result of the comparison is that the measured value and the stored value are inconsistent, i.e. if they differ by more than some small threshold value, an authentication-failed signal 22 is produced. In response to the authentication-failed signal the controller may simply deny access to the purported subscriber, or it may initiate a further authentication procedure. In either case, it may also make a record of the failed authentication, so that such events can be further investigated by the service provider.

Although a specific embodiment of the invention has been particularly described it will be understood that the scope of the invention is not limited by details thereof, but is defined by the claims. In particular, the invention is not limited to CDMA systems. In fact, the invention may be particularly advantageous also with time-division multiplex (TDM) systems. Also, it is not limited to monitoring of propagation delay. Other suitable characteristics include directional characteristics, which may be obtained by using directionally sensitive apparatus at the base station (sectorisation), or as a by-product of diversity reception techniques. Preferably, however, such other characteristics are used in combination with propagation delay.

We claim:

1. A method of subscriber authentication in a static radio local loop system, comprising the steps of:

monitoring one or more characteristics of signals received at the base station purporting to be from a subscriber station, said one or more characteristics being indicative of the distance between said purported subscriber station and said base station;

comparing said one or more characteristics with stored information indicative of the expected distance between the corresponding genuine subscriber station and said base station; and producing a failed-authentication signal if said one or more characteristics do not agree with said stored information.

2. A method as claimed in claim 1, wherein said one or more characteristics include propagation delay.

3. A method as claimed in claim 1, wherein said one or more characteristics include a directional characteristic.

4. A method as claimed in claim 1, comprising initiating a further authentication procedure for said purported subscriber station in response to said failed-authentication signal.

5. A method as claimed in claim 1, comprising making a record of events in which failed-authentication signals are produced.

6. A static radio local loop system, comprising:

means for monitoring one or more characteristics of signals received at the base station purporting to be from subscriber stations, said one or more characteristics being indicative of the distances between said purported subscriber stations and said base station;

memory means for storing information indicative of the distances between the corresponding genuine subscriber stations and said base station; and means for comparing said one or more characteristics with said stored information and producing a failed-authentication signal if said one or more characteristics do not agree with said stored information.

7. A system as claimed in claim 6, wherein said one or more characteristics include propagation delay.

8. A system as claimed in claim 6, wherein said one or more characteristics include a directional characteristic.

9. A system as claimed in claim 6, comprising means for carrying out a further authentication procedure for said purported subscriber station in response to said failed-authentication signal.

10. A system as claimed in claim 6, comprising means for making records of events in which failed-authentication signals are produced.

* * * * *